Nov. 8, 1927.  1,648,504

L. OFFENBACHER

APPARATUS FOR PRODUCING A SILVER COATING ON GLASS

Filed Sept. 12, 1924   4 Sheets-Sheet 1

Inventor:

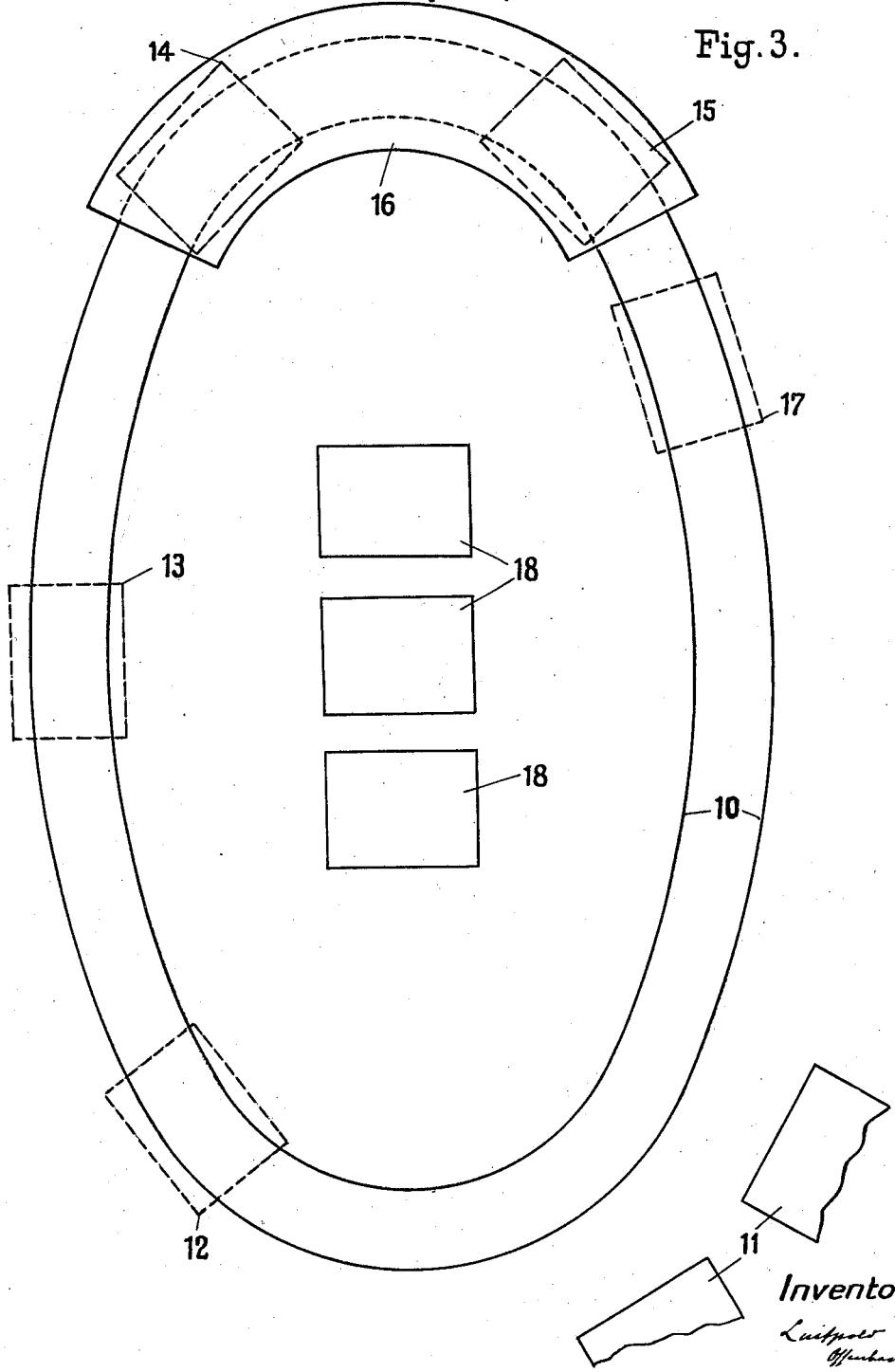

Nov. 8, 1927. 1,648,504
L. OFFENBACHER
APPARATUS FOR PRODUCING A SILVER COATING ON GLASS
Filed Sept. 12, 1924 4 Sheets-Sheet 3
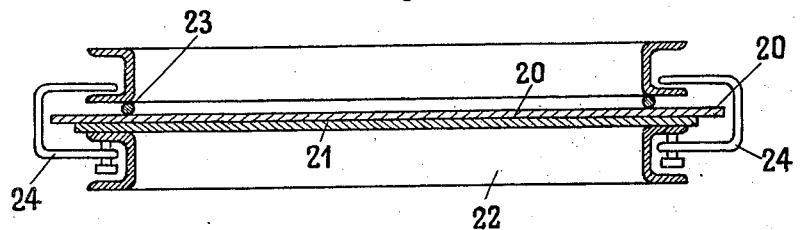
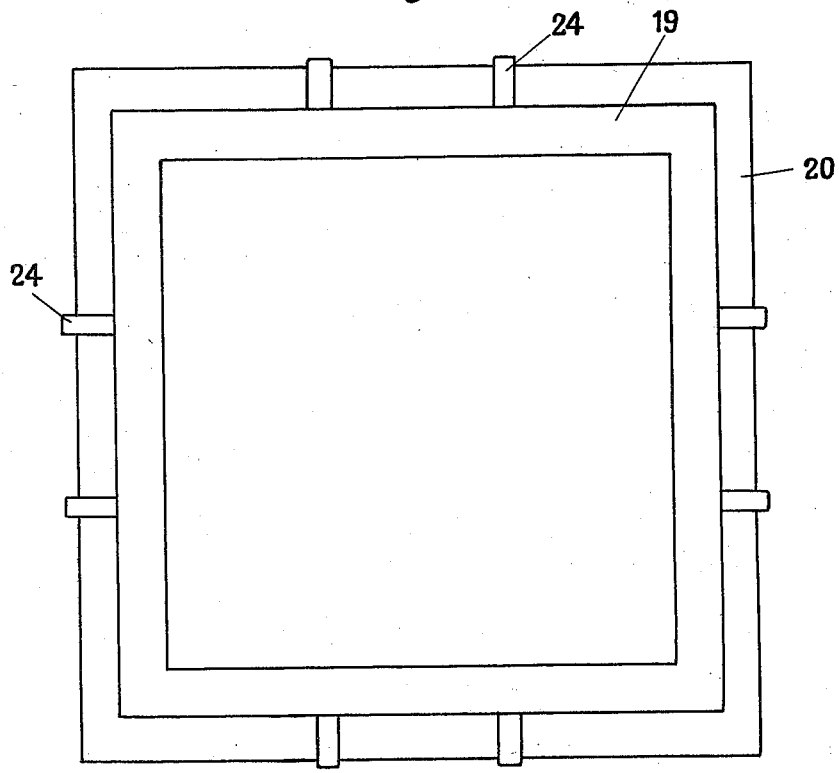
Inventor:
Leupold Offenbacher Nov. 8, 1927.  
L. OFFENBACHER  
1,648,504  
APPARATUS FOR PRODUCING A SILVER COATING ON GLASS  
Filed Sept. 12, 1924  4 Sheets-Sheet 4
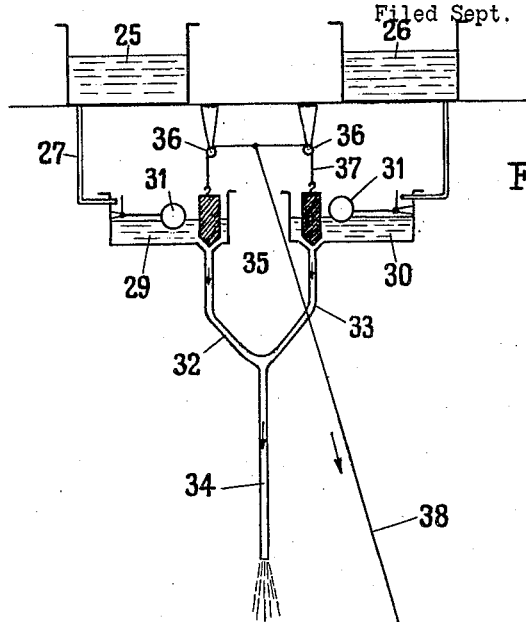
Fig. 6.
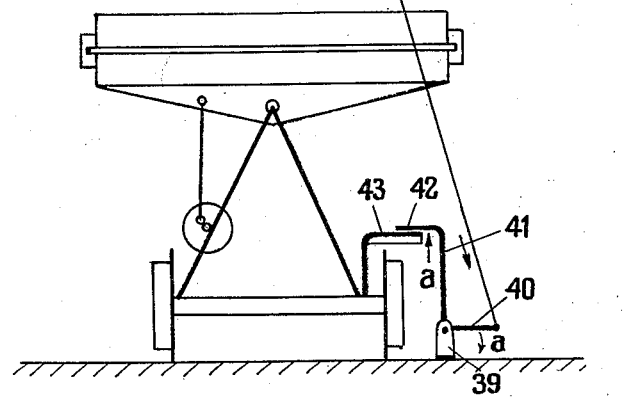
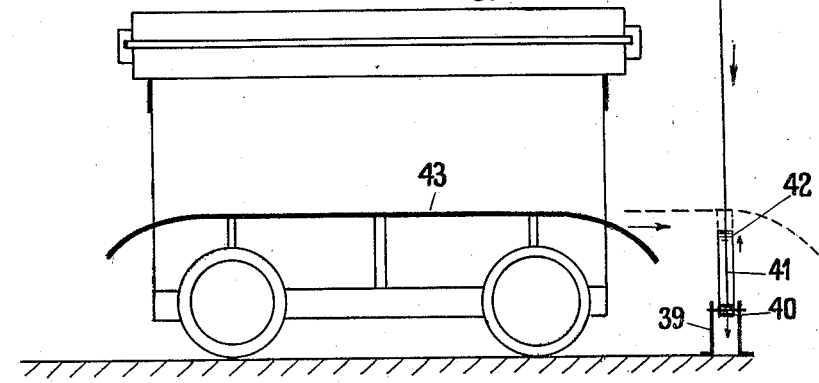
Fig. 7.
Inventor:

Patented Nov. 8, 1927.

1,648,504

UNITED STATES PATENT OFFICE.

LUITPOLD OFFENBACHER, OF FURTH, GERMANY, ASSIGNOR TO BAYERISCHE SPIEGEL-GLASFABRIKEN BECHMANN-KUPFER, OF FURTH IN BAVARIA, GERMANY.

APPARATUS FOR PRODUCING A SILVER COATING ON GLASS.

Application filed September 12, 1924, Serial No. 737,338, and in Germany September 19, 1923.

For producing a silver coating on glass by means of a silver solution so-called see-saw or shaking tables are frequently used, that is tables which by a circular ridge are transformed into tubs adapted to contain the silver solution and to which during the plating process a basculating motion is transmitted. The sheets or plates of glass after having been washed are placed on such see-saw tables and removed from the same after they have been silver coated, whereupon they are washed again on separate stands to be conveyed on trucks into drying chambers. After the sheets or plates of glass have dried the trucks are pulled out of the drying chamber, the sheets or plates of glass are taken off and coated on separate tables with shellac or varnish.

This invention has for its object to simplify and improve this known method of silver coating sheets or plates of glass. According to the improved method the sheets or plates of glass are brought onto a transportable see-saw table the silver coating being done while the table is being moved to the several working places.

The means for carrying out the improved working method are shown by way of example on the accompanying drawing, in which:—

Fig. 3 is a plan view of the track for the transportable table.

Figs. 4 and 5 show a modified construction of the tub for the sheets or plates of glass.

Figs. 6 and 7 illustrate a device for feeding the silver solution into the tub.

Figure 1:
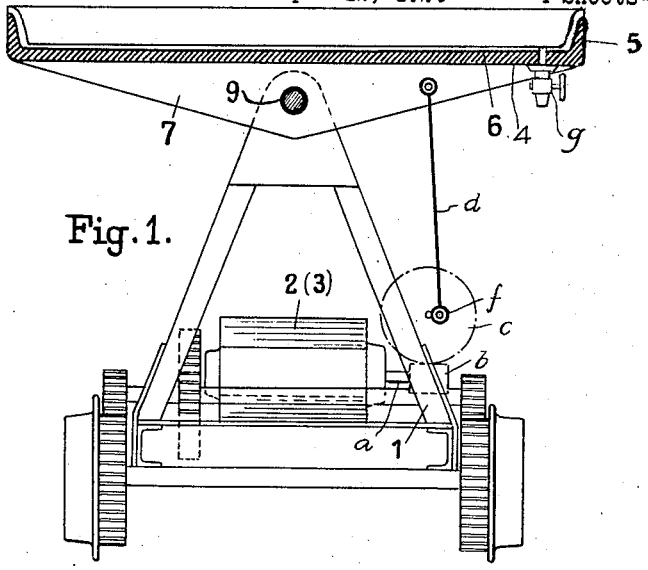
Figs. 1 and 2 show a transportable see-saw table in two side elevations, partly in section, displaced at 90° the one to the other.
Figure 2:
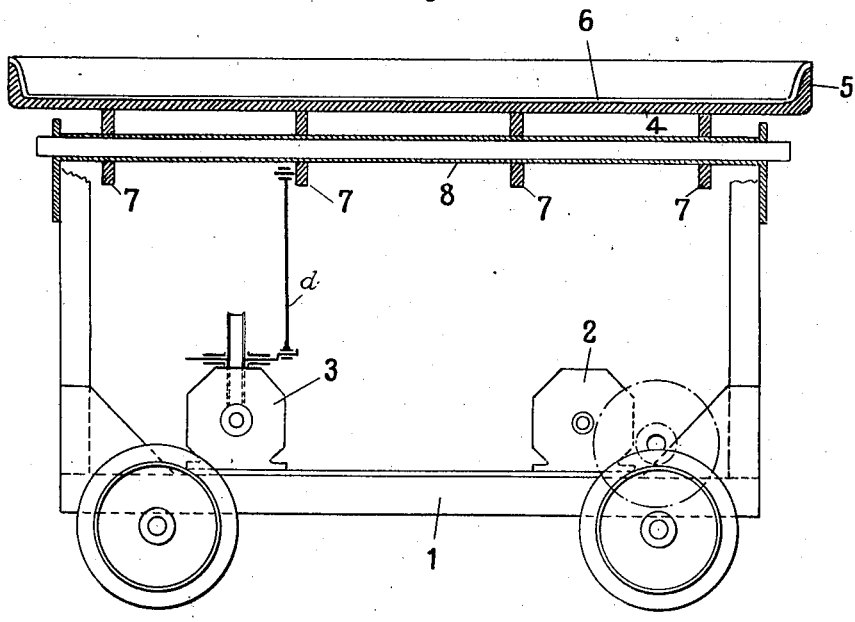

The support for the see-saw table consists of a carriage in the frame 1 of which an electro-motor 2 for propelling the carriage and an electro-motor 3 for producing the rocking movement are mounted. The transmission from the electro-motors to the driving wheels or to the see-saw table respectively is effected through the intermediary of any convenient mechanical means, the see-saw table itself consisting of a plane ground plate 4 having an upwardly turned rim 5, a tub 6 being placed on this table. By means of transverse ribs 7 and bearings 8 the plate 4 is mounted on a horizontal axle 9 journaled in the carriage frame 1. By starting the motor 3 a see-saw movement is communicated to the plate 4, the motor 2 serving merely to propel the carriage on which the plate 4 is mounted. The see-saw movement is transmitted from the motor 3 to the table or plate 4 for instance by a worm $b$ on the shaft $a$ of the motor, said worm meshing with a worm wheel $c$ which carries a crank $f$, on which a rod $d$ is hinged the other end of which is hingedly connected with the rib 7 of table 4. The silver coating process is carried out during the time when the carriage with the see-saw table circulates on the track 10, in the following manner:

The sheets or plates of glass which have been washed on the washing tables 11 are placed into the empty tub 6 on the table 4. At the position 12 of the carriage the silver solution is fed into the tub and the see-saw movement of the tub is started by means of the motor 3. At the position 13 of the carriage the see-saw movement of the tub is automatically interrupted in such a manner that the tub remains in an inclined position and all the silver solution can flow out through the discharge-cock $g$ of the tub. The opening of the discharge cock $g$ is controlled by a stationary abutment of the track. When the travel of the carriage continues the sheets or plates of glass are sprayed by means of a spraying device which is operated by abutments on the carriage. From point 14 to point 15 of the track the carriage moves through a heated drying chamber in the shape of a tunnel 16 until it is stopped at 17 so that the dried silver coated sheets or plates of glass can be removed from the tub to be placed on the tables 18 to be varnished or coated with shellac. From point 17 the travel of the carriage begins again.

The tub 6 is made from rubber and the bottom plate and the side walls are made in one piece. The bottom of the tub is so thin that it adapts itself to its support. If this support is perfectly plane, consisting for instance of a glass plate, a ground metal plate or the like the sheets or plates of glass placed into the tub adapt themselves to the bottom of the tub so that almost no silver solution can penetrate between the lower face of the sheets or plates of glass and the bottom of the tub. It is of course supposed that the bottom of the tub is of equal thickness throughout.

The bottom of the tub and the side walls of the same might however not be made in one piece. In this case the tub consists of a frame 19 (Fig. 4) which forms the side walls and of a bottom plate 20 which (as shown in Figs 4 and 5) projects over the frame 19 so that it can be stretched and consequently lay always flat on the support. The supporting plate 21 for the tub rests upon a frame 22 of U irons. Between the frame 19 of the irons and the rubber bottom 20 a packing ring 23 is inserted. The two frames 19 and 22 are pressed together by clamps 24. When the clamps 24 have been removed the rubber bottom 20 can be gripped at the edge and stretched, the clamps 24 being put on again after the stretching.

By the insertion of the rubber packing 23 between the bottom 20 of the tub and the frame 19 the otherwise required putty packing between these two parts is avoided. As such putty packing is rather easily destroyed it would be impossible to let the glass plates remain in the tub during the drying.

It is not necessary that the bottom of the tub is made from rubber, it might consist of a dressed or ground metal plate, a glass plate or in general of any perfectly plane plate made from a material not liable to be attacked by the silver solution. The same material as for the tub bottom can be used for the side walls of the tub, they might however be made from any other material.

The supplying of the silver solution into the tub is effected automatically with the aid of a special device as always a predetermined quantity of the solution has to be supplied, in order to reduce as much as possible the consumption of solution. Such a device is shown in Figs 6 and 7 diagrammatically in two elevations standing at 90° the one to the other.

On the floor of the room over the working room two reservoirs 25, 26 are arranged which are connected each by a conduit 27, 28 with two lower reservoirs 29, 30. These lower reservoirs 29, 30 have each a float valve 31 to accurately regulate the inflow of solution. Each lower reservoir 29, 30 has further a discharge pipe 32, 33 which unite above the tub to form one single pipe 34. The discharge pipes 32, 33 are shut by valves 35, the two valves 35 being connected with one another by means of a rope 37 guided on guide pulleys 36. A traction element 38 on the rope 37 is connected with an elbow lever 40 pivotally mounted on a bracket 39 on the floor, a vertical arm 41 of the elbow lever being set off at 42. This set off part 42 cooperates with a guide rail 43 of the carriage.

When the carriage arrives at the position 12 the guide rail 43 comes in contact with the set off part 42 of elbow lever 40, 41 and makes the same oscillate in the direction of the arrow $a$. The traction element 38 is thus pulled and the valves 35 are opened which remain open so long as the set off part 42 of the elbow lever 40, 41 slides on the guide rail 43 of the carriage. During this time the lower reservoirs 29, 30 are completely emptied. During the emptying the floats 31 in the reservoirs 29, 30 sink and open the valves of the conduits 27, 28 between the lower and upper reservoirs so that a fresh quantity of solution can flow into the lower reservoirs. The same proceeding is repeated when the carriage passes again over point 12.

The number of upper and lower reservoirs depends on the number of liquids of which the silver solution is composed. This arrangement may be modified according to requirement. The discharge pipes from the upper reservoirs might for instance terminate directly into the tub. In this case the discharge pipes have valves which are opened by the action of the guide rail of the carriage during a predetermined time. The discharge pipes are of different diameters so that the quantity of liquid discharged from each reservoir can be accurately regulated.

For the guide rail of the carriage an abutment on the carriage might be substituted which serves for the same purpose as the guide rail.

I claim:—

1. An apparatus for silver coating sheets or plates of glass comprising in combination an oval track, a heated drying chamber in the shape of a tunnel on said track, a transportable frame, wheels on said frame, a table on said frame, means for producing a see-saw motion of said table, and means for propelling said transportable frame so that it runs on said track.

2. An apparatus for silver coating sheets or plates of glass comprising in combination an oval track, a heated drying chamber in the shape of a tunnel on said track, a transportable frame, wheels on said frame, a table on said frame, means for producing a see-saw motion of said table, a rubber tub on said table designed to receive a silver solution and the sheets or plates of glass to be coated, and means for propelling said transportable frame so that it runs on said track.

3. An apparatus for silver coating sheets or plates of glass comprising in combination an oval track, a heated drying chamber in the shape of a tunnel on said track, a transportable frame, a table on said frame said table consisting of a plane horizontal plate, means for producing a see-saw motion of said table, a rubber tub designed to receive a silver solution and the sheets or plates of glass to be coated mounted on said plane horizontal table said rubber tub consisting of a rubber bottom of a frame of U-irons forming the side walls of the bottom, a rubber packing inserted between said rubber bottom and said frame and of clamps fastening said rubber bottom in stretched position on said frame, and means for propelling said transportable frame so that it runs on said track.

4. An apparatus for silver coating sheets or plates of glass comprising in combination an oval track, a heated drying chamber in the shape of a tunnel on said track, a transportable frame, a table on said frame said table consisting of a plane horizontal plate on which the sheets or plates of glass to be coated are mounted, means for producing a see-saw motion of said table, a rubber tub designed to receive a silver solution and consisting of a rubber bottom a frame of U-irons forming the side walls of the bottom a rubber packing inserted between said rubber bottom and said frame and of clamps fastening said rubber bottom in stretched position on said frame, means for propelling said transportable frame so that it runs on said oval track, several reservoirs one for each constituent of the silver solution arranged above said oval track, discharge pipes extending from said reservoirs, outlet float valves at the ends of said discharge pipes, arms projecting from said float valves, and elements on said frame of said rubber tub designed to act upon said arms for operating said float valves when said tub is underneath the corresponding float valve.

5. An apparatus for silver coating sheets or plates of glass comprising in combination an oval track, a heated drying chamber in the shape of a tunnel on said track, a transportable frame, a table on said frame said table consisting of a plane horizontal plate on which the sheets or plates of glass to be coated are mounted, means for producing a see-saw motion of said table, a rubber tub designed to receive a silver solution and said sheets or plates of glass said rubber tub consisting of a rubber bottom of a frame of U-irons forming the side walls of the bottom a rubber packing inserted between said rubber bottom and said frame and of clamps fastening said rubber bottom in stretched position on said frame, means for propelling said transportable frame so that it runs on said oval track, several reservoirs one for each constituent of the silver solution mounted on the floor above the working chamber, lower reservoirs, pipes connecting said upper reservoirs with said lower reservoirs, float valves in said upper reservoirs regulating the flow of the liquids so that accurately measured quantities of liquid are discharged from the upper reservoirs into the lower reservoirs, discharge pipes downwardly extending from said lower reservoirs to above the tub containing the sheets or plates of glass, float valves in said discharge pipes, arms projecting from said float valves, elements on said frame of said rubber tub designed to act upon said arms for operating said float valves at certain points of said oval track, and means for connecting said arms to said float valves of said upper reservoirs.

In testimony whereof I affix my signature.

LUITPOLD OFFENBACHER.